Oct. 26, 1971     E. C. MOELLER     3,615,059

PNEUMATIC DRIVE MEANS FOR GRINDING APPARATUS

Filed April 14, 1969     2 Sheets-Sheet 1

INVENTOR.
EUGENE C. MOELLER
BY Bruce C Lutz
ATTORNEY

United States Patent Office 3,615,059
Patented Oct. 26, 1971

3,615,059
PNEUMATIC DRIVE MEANS FOR GRINDING APPARATUS
Eugene Charles Moeller, 2017 24th Street Road, Greeley, Colo. 80631
Filed Apr. 14, 1969, Ser. No. 815,694
Int. Cl. B02c 4/00, 4/06, 11/04
U.S. Cl. 241—224      6 Claims

ABSTRACT OF THE DISCLOSURE

A grinding mechanism for grinding various materials and having a hopper divided into two portions. The hopper portions having separate mechanisms for advancing material wherein the upper portion is advanced by a pneumatic tire for reducing noise and increasing the reliability and life expectancey of the apparatus and the lower portion uses oscillatory motions.

---

The present invention relates generally to material grinding apparatus and more particularly to apparatus for grinding feeds and foilage.

When grinding feeds such as small grains, the slope of a hopper will ordinarily allow the movement by gravity of much of the grain from the upper portion of a hopper for feeding the grinding mechanism in a lower portion. The slope of a hopper being a constraint on the size of the hopper and height. However, when materials such as alfalfa, corn stalks and other foilage type materials are to be ground, the material tends to bind up and not fall into the grinding mechanism by gravity. A previous application 663,666 filed Aug. 28, 1967 in my name and entitled "Method and Apparatus for Feeding Materials" and now issued as Pat. No. 3,483,906 illustrates apparatus which is very satisfactory for grinding small grains. However, the present invention adds a hopper to the apparatus shown in this previously filed application and rotates the hopper in a quiet and efficient manner to reduce wear and tear on the machine. It is realized that some of the prior art shows rotating upper hoppers such as in a patent to Oberwortman, 2,650,745, issued Sept. 1, 1953. However, as will be noted, this is driven by a chain link drive which not only tends to wear out quickly and cost a great deal of money to replace, but tends to be quite noisy in operation.

The present invention on the other hand utilizes an ordinary pneumatic vehicle tire placed contiguous the upper hopper and a fixed distance away wherein inflating the tire causes sufficient frictional forces between the tire and the upper hopper to rotate the upper hopper along with rotation of the tire.

It is therefore an object of the present invention to provide improved grinding apparatus.

Other objects and advantages of the present invention will be apparent from a reading of the specification and appended claims in conjunction with the drawings wherein:

Figure 2:
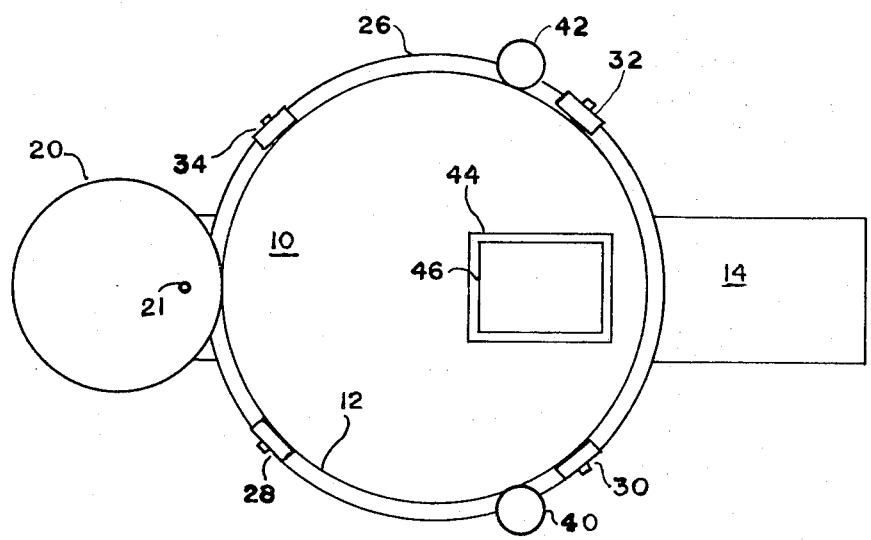
FIG. 2 is a cross-sectional view through lines 2—2 of FIG. 1 for illustrating the support mechanism for the upper portion of the grinding mechanism's hopper.
Figure 1:
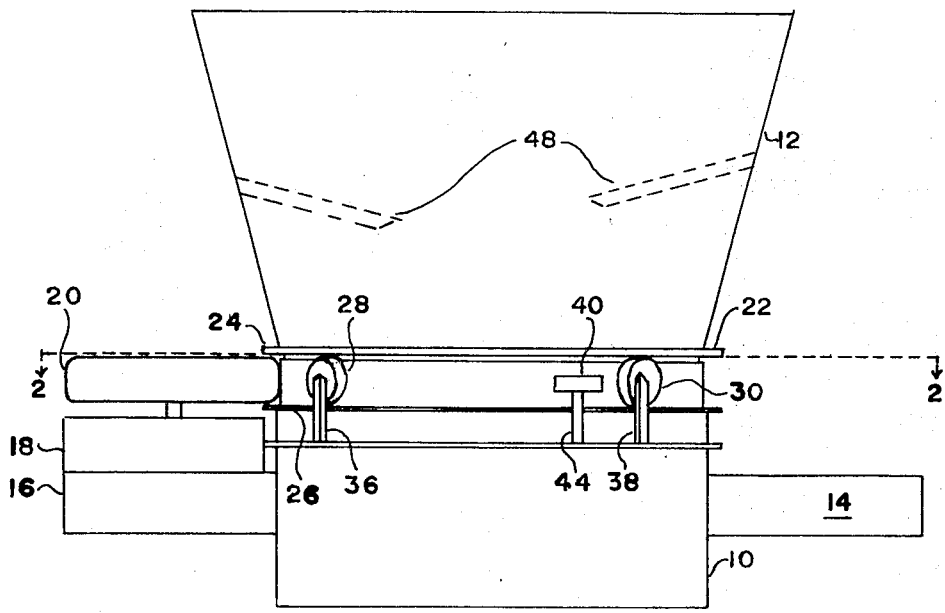
FIG. 1 is a side view of a generalized diagram of the invention.

Referring to FIG. 1 it will be noted that a support and grinding or chopping mechanism base 10 is utilized to support an upper hopper or enclosure portion 12. The support and grinding mechanism block 10 contains apparatus such as shown in my above-referenced application. In other words, it contains a lower hopper and the oscillating mechanism for moving material in the lower hopper. Support 10 also includes a dispensing apparatus 14 for removing the ground or chopped material from the grinding mechanism and also a support 16 to hold a rotating power source 18 which is utilized to rotate an inflatable cylindrical pneumatic tire means or friction driving source means 20 including a valve or other means for changing the internal pressure 21. As will be noted, hopper 12 has a track portion 22 having upper and lower flanges 24 and 26 partially enclosing one edge of the pneumatic means 20. Vertical support means are shown in FIGS. 1 and 2 as wheels or cylindrical support means 28, 30, 32 and 34. As shown in FIG. 1, these wheels are held in position by supports 36 and 38 from the support mechanism 10 and have horizontal axes. The power source in combination with support 16 holds the pneumatic tire 20 a fixed distance from the hopper 12 and in particular the track 22 so that increasing the pressure in the tire 20 will increase the driving friction therebetween. Also shown in FIGS. 1 and 2 are cylindrical thrust opposing means or wheels 40 and 42 each having a vertical axis which is parallel with the other and is parallel with the axis of the pneumatic tire 20. The wheel 40 is held in position by a support 44. As will be ascertained, the hopper 12 is supported by flange 24 on the various wheels 28–34. Horizontal movement of the hopper is prevented by the thrust opposing means 40 and 42 which are placed on the opposite side of the hopper 12 from the driving source 20 which, in rotational driving, applies a horizontal force to hopper 12. While two thrust opposing means are shown, the device will operate with one or will operate with more than two. The same versatility in required numbers applies to the vertical support means 28–34. As previously mentioned, FIG. 2 is a cross-sectional view through lines 2—2 of FIG. 1 and thus does not show many of the items in FIG. 1. However, where the items are shown, the numerical designations are the same.

Within the grinding mechanism 10 is a grinding material opening 44 and a grinding wheel or drum 46. Also shown as dashed lines in FIG. 1 are spikes 48 which may optionally be used for increasing rotational friction to the foilage in hopper 12 over that obtained from the interior walls. As may be ascertained from my previously recited application and the present application, when foilage is placed in the upper hopper, it will be rotated by the upper hopper (and spikes 48 if used) such that the rotational agitation will cause the material to be continually advanced and to drop into the lower hopper portion where it is advanced by oscillation techniques into the opening 44 and ground by drum 46. The oscillation technique comprises slowly moving the lower hopper forward and upward and then quickly moving it downward and backward. From the grinding drum 46 it is removed by the dispensing apparatus 14.

Figure 3:
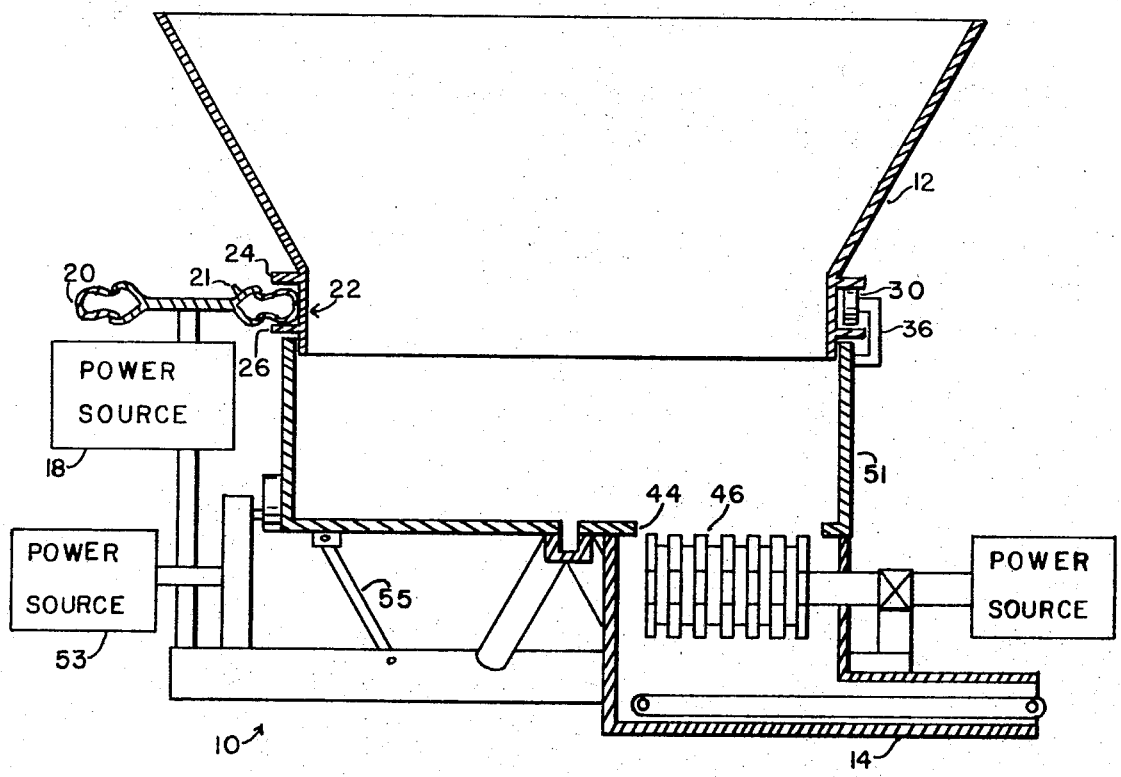
FIG. 3 is a cross sectional view of the grinder showing substantially the same drawing as in the above-referenced patent showing the coaction of the present invention therewith in more detail.

In FIG. 3 many of the components previously numbered are again identically numbered. In other words, the inflatable means or tire 20 is shown contiguous the track 22 intermediate the upper and lower flanges 24 and 26. One of the vertical support means 30 is shown holding the upper hopper 12 from falling down into or onto and binding on a lower hopper generally designated as 10 and more specifically designated as 51. This wheel 30 is held in place by support 36. As is shown in FIG. 1 there are other vertical support means and also horizontal support means. However, these are not shown in the cross sectional view. As indicated in the above referenced application a power source 53 is utilized to rotate the lower hopper 51 over a short distance and it rises and falls in conjunction with the angled supports such as 55. Since there is a vertical spacing between the upper and lower hoppers 12 and 51, respectively, the lower hopper 51 can rise vertically a short distance without causing any binding in the circular or rotative movement of upper hopper 12 in response to the rotation device 20 powered by source 18. Thus, any material in the upper hopper 12 is continually rotated and helps the action of lower hopper 51 to feed any material in the lower hopper 51 toward the opening 44 within which is the grinding drum 46. The material after being ground drops into the outputting mechansm generally designated as 14.

While I have described one type of inflatable pneumatic means for rotating the upper hopper and have described one embodiment for building the upper hopper so as to be rotated by the tire 20 I wish to be limited only by the scope of the claims since other methods may be utilized to practice my invention.

I claim:
1. Material grinding apparatus of the type having separate material advancing mechanisms for upper and lower portions of a hopper comprising, in combination:
   inflatable cylindrical pneumatic means having a driving exteror surface and means for changing the internal pressure of said pneumatic means;
   upper hopper means, including track means, mounted for rotation as part of the upper portion with said track means contiguous said driving exterior surface; and
   means mounted a fixed distance from said hopper means for rotating said pneumatic means, the driving friction between said upper hopper means and said pneumatic means being increased by increasing the internal pressure of said pneumatic means.

2. Apparatus as defined in claim 1 wherein the pneumatic means has a vertical rotational axis and comprising in addition two cylindrical thrust opposing means having vertical rotational axes and mounted contiguous said track means to allow rotation while resisting horizontal movement of said upper hopper means.

3. Apparatus as claimed in claim 2 wherein said pneumatic means is a tire and said axes of said pneumatic means and said thrust opposing means form a triangle and in addition said track means includes upper and lower outwardly extending flanges partially enclosing said pneumatic means and at least three cylindrical holding means having horizontal axis spaced around said track means of said upper hopper means contiguous said upper flange for allowing rotation and resisting downward movement of said upper hopper means.

4. Apparatus as claimed in claim 1 wherein said track means is on the exterior of said upper hopper and includes upper and lower outwardly extending flanges and the lower portion of said hopper means includes means for receiving material to be ground from said upper hopper and for advancing it toward a grinder opening in the floor of said lower portion by short oscillatory movements first forwardly and upward and then downward and backward.

5. In material grinding apparatus of the type comprising a rotating upper hopper and an oscillating lower hopper and floor wherein the oscillating lower hopper advances material to an opening in the floor containing a grinding drum by slowly moving upward and forward and quickly moving downward and backward faster than the material to be ground and wherein the upper hopper is mounted for rotation with respect to the floor and is restrained from horizontal movement with respect to the floor the improvement comprising a pneumatic friction driving means mounted contiguous said upper hopper and a fixed distance therefrom such that increasing the pressure internal said driving means increases driving friction although remaining resilient enough to absorb shocks and irregularities of said upper hopper.

6. Apparatus as claimed in claim 5 comprising, in additon at least two cylindrical means each having an axis parallel with the axis of said driving means and spaced around said upper hopper for preventing horizontal movement thereof due to horizontal forces from said driving means.

References Cited
UNITED STATES PATENTS

| | | | |
|---|---|---|---|
| 1,534,855 | 4/1925 | Lowenthal | 241—224 X |
| 2,650,745 | 9/1953 | Oberwortman | 146—123 X |
| 3,056,561 | 10/1962 | Hukki | 241—178 X |
| 3,146,918 | 9/1964 | Williams | 222—199 |

DONALD G. KELLY, Primary Examiner

U.S. Cl. X.R.

241—301